United States Patent
Chen

(10) Patent No.: US 6,380,272 B1
(45) Date of Patent: Apr. 30, 2002

(54) MANUFACTURING METHOD FOR STRUCTURAL MEMBERS FROM FOAMED PLASTIC COMPOSITES CONTAINING WOOD FLOUR

(76) Inventor: Kuei Yung Wang Chen, 201 Tung Hwa Rd., Taipei (TW)

( * ) Notice: Subject to any disclaimer, the term of this patent is extended or adjusted under 35 U.S.C. 154(b) by 0 days.

(21) Appl. No.: 09/644,776

(22) Filed: Aug. 23, 2000

(51) Int. Cl.$^7$ .............................. C08J 9/00; D04H 3/16
(52) U.S. Cl. ........................ 521/79; 264/54; 264/101; 264/115; 264/120; 264/321; 521/84.1; 521/145
(58) Field of Search ..................... 521/84.1, 79, 145; 264/54, 101, 115, 120, 321

(56) References Cited

U.S. PATENT DOCUMENTS

| | | | | |
|---|---|---|---|---|
| 4,094,685 A | * | 6/1978 | Lester et al. | 521/76 |
| 4,226,943 A | * | 10/1980 | Tsurushige et al. | 521/75 |
| 4,506,037 A | * | 3/1985 | Suzuki et al. | 521/97 |
| 5,866,641 A | * | 2/1999 | Ronden et al. | 521/97 |
| 6,066,680 A | * | 5/2000 | Cope | 521/79 |

* cited by examiner

*Primary Examiner*—Morton Foelak
(74) *Attorney, Agent, or Firm*—Joseph L. Strabala, Esq.

(57) ABSTRACT

Structural members for doors and the like can be manufactured from plastic foamed composites containing wood flour by the steps of (1) dry mixing a blend of powders including PVC powder, wood flour, powdered thermal stabilizers, powdered foaming agent and a powdered gelatinization agent, (2) adding the mixed powder to a thermal stirring mixer to obtain a homogeneous dispersion of the several powders (3) transferring the homogeneous dispersion of powders to a cold stirring mixer and stirring at speeds sufficient to avoid agglomeration of the homogeneous dispersion of the several powders and (4) placing the non-agglomerated homogeneous dispersion of the several powders in a feeding hopper of an extrusion machine and extruding shapes for the desired components. The vacuum venting of the extrusion machine can be controlled to achieve components with more desirable surface features. Lubricants can be added to the homogeneous dispersions of the several powders to aid in the extrusion process.

9 Claims, 1 Drawing Sheet

MANUFACTURING METHOD FOR STRUCTURAL MEMBERS FROM FOAMED PLASTIC COMPOSITES CONTAINING WOOD FLOUR

BACKGROUND OF THE INVENTION

Waste products from manufacturing processes involving wood construction include saw dust and other wood wastes. In the past these products were burned or disposed of in land fills. More recently these waste wood products have been used as fillers in plastic composite such as polyvinyl chloride [PVC] and other plastic resins. Such uses of these waste products have reduced the consumption of wood and contributed to better environmental uses of such wastes. Due to the availability of wood waste products as described herein their use as additives/fillers of organic polymers has been extensively studied, see e.g., Dalvag et al., "The Efficiency of Cellulosic Fillers in Common Thermoplastics. Part II. Filling with Process Aids and Coupling Agents", International Journal of Polymeric Materials, 11:9–38 (1985).

Klason et al., "The Efficiency of Cellulosic Fillers in Common Thermoplastics. Part I. Filling Without Processings Aids or Coupling Agents", International Journal of Polymeric Material, pp. 159–187 (March 1984).

Kokta et al., "Composites of Poly(Vinyl Chloride) and Wood Fibers. Part II: Effect of Chemical Treatment", Polymer Composites, 11(2):84–89 (April 1990).

Kokta et al., "Composites of Polyvinyl Chloride-Wood Fibers. I. Effect of Isocyanate as a Bonding Agent", Polym. Plast. Technol. Eng., 29(1&2):87–118 (1990).

Kokta et al., "Composites of Polyvinyl Chloride-Wd Fibers. III. Effect of Silane as Coupling Agent", Journal of Vinyl Technology, 12(3):146–153 (September 1990).

Kokta et al., "Use of Wood Fibers in Thermoplastic Composites", Polymer Composites, 4(4):229–232 (October 1983).

Maldas et al., "Composites of Polyvinyl Chloride-Wood Fibers: IV. Effect of the Nature of Fibers", Journal of Vinyl Technology, 11(2):90–98 (June 1989).

Raj et al., "Use of Wood Fibers as Filler in Common Thermoplastic Studies on Mechanical Properties", Science and Engineering of Composite Materials, 1(3):85–98 (1989).

Raj et al., "Use of Wood Fibers in Thermoplastics. VII. The Effect of Coupling Agents in Polyethylene-Wood Fiber Composites", Journal of Applied Polymer Science, 37:1089–1103 (1989).

Rogalski et al., "Poly(Vinyl-Chloride) Wood Fiber Composites", Antec '87, pp. 1436–1441.

Sean et al., "A Study of the Mechanical Properties of Wood Fiber to Polystyrene Composites", Drevarsky Vyskum, Zvazuk 133 (1992).

Woodhams et al., "Wood Fibers as Reinforcing Fillers for Polyolefins", Polymer Engineering and Science, 24(15): 1166–1171 (October 1984).

Yam et al., "Composites From Compounding Wood Fibers With Recycled High Density Polyethylene", Polymer Engineering and Science, 30(11):693–699 (June 1990).

Not withstanding the literature, such as noted above, the combining of wood fibers or wood flour with plastics has not been straight forward. For example, see U.S. Pat. No. 6,015,612 issued to Deaner et al which teaches that by the use of heat and pressure wood fibers can be wetted intercellular with plastic resins reading to composites having a Young's modules higher than neat PVC.

Other patents are directed to the manufacture of structural parts for door frames and the like from composites of PVC and wood fibers/flours, see for example U.S. Pat. No. 5,406,768 issued to Giuseppe et al.

The field of this invention is different in that it involves the manufacture of such structural parts from foamed PVC and wood flour composites. In this regard see U.S. Pat. No. 6,066,680 issued to Cope which teaches the encapsulation of the wood flour with the resin in the form of pellets prior to extrusion of such members. This invention avoids the step of forming pellets, as taught in the patent issued to Cope.

Manufacturing structural members with conventional foamed plastic composites, is typically limited by physical properties of such composites. Such composites have large linear expansion coefficients, low dimensional stability and are subject to significant thermal distortion. Also such composites have insufficient rigidity (E value) and are prone to warping making them unsuitable for door and window frames. More often than not such members have non-wood like or plastic like surfaces which are undesirable in many applications where wood has been typically used in the past, e.g., window frames.

Following the method of the present invention not only reduces the above undesirable characteristics of such foamed composites but produces structural members which are better suited for applications like door and window frames and the like.

SUMMARY OF THE INVENTION

The manufacturing method of this invention involves (a) the mixing the wood flour with powdered PVC resin along with other powdered components, such as thermal stabilizers, foaming agents, lubricants, fillers and pigments to obtain a mixture of powders, (b) placing the mixture of powders in a thermal stirring mixer and employing low speed mixing to blend the mixture of powders followed by a higher speed mixing to disperse said powders into a homogeneous blend, (c) placing said homogeneous blend in a cold stirring mixture and mixing at low speeds to prevent agglomeration of the homogeneous blend from the thermal stirring mixer and (d) then adding the homogeneous blend to an extrusion machine and extruding foamed structural shapes.

DESCRIPTION OF THE DRAWINGS

The features of this invention will become apparent from the following description with reference to the accompanying drawings, in which.

DESCRIPTION OF A PREFERRED EMBODIMENT

Figure 1:
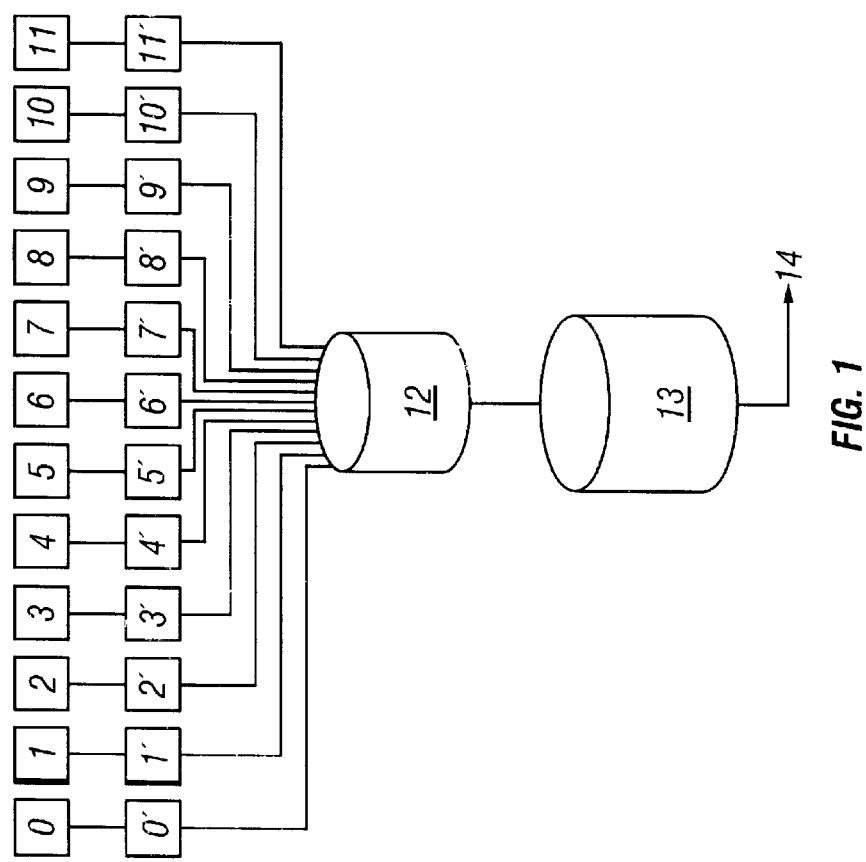
FIG. 1 is a shematic diagram of the processes employed in the present invention for preparing a blend of powders for an extruder.

Referring to the schematic in FIG. 1, it can be seen that sources of the individual powdered components employed in this invention are identified with boxes 0 through 11, with separate metering devices for each source identified as 0' through 11' to control the amount of each individual component fed to the thermal mixer 12. Source 0 is for powdered PVC, source 1 is for wood flour, source 2 is for thermal stabilizers, source 3 is for inorganic foaming aids, source 4 is for organic foaming agents, source 5 is for inorganic foaming agents, source 6 is for processing aids, source 7 is for modifiers, source 8 is for lubricants, source 9 is for other lubricants, source 10 is for fillers and source 11 is for pigments. Typically these several components are in powdered form and are fed to the thermal mixer in the desired quantities by the metering devices. The schematic represents a continuous batch process to be set up whereby pre-set quantities of the components are fed to the thermal mixer via separate feed lines from metering devices.

PVC powder (source 0) is commonly available and in the instant invention PVC powders prepared in bulk by suspension polymerization. Suitable PVC powders are those sold by Formosa Plastics Corporation as S-60, S-65. As to the wood flour (source 1) it can be derived from hardwood wastes, will preferably have a fiber length below 0.6 mm and a fiber diameter is between 0.04 to 0.6 mm along with an aspect ratio between 2 to 6. Such wood flour is sold by JRS as CB-120 as well as other entities.

The thermal stabilizers (source 2) are selected from organic and/or inorganic thermal stabilizer in powder form which are used to prevent the thermal degradation of PVC resin, such as organic tin carboxylate, organic tin mercaptide and barium/zinc stabilizer.

Used as inorganic foaming aids (source 3) are magnesium oxide and zinc oxide which are employed to increase the volume of gas from the organic and inorganic foaming agents.

For organic foaming agents (source 4) selections can be made from azodicarbonamide, benzene-sulfohydrazide and diphenylene oxide-4, 4'-disulfohydrazide which act as blowing agents to provide gas for the foamed product.

For inorganic foaming agents (source 5) which also act as blowing agents to provide gas for the foam product, such as sodium bicarbonate.

For processing aids (source 6) which are used for enhancing the gelatinization of the mixed powders, the following can be used methyl methacrylate copolymer and high molecular weight acrylic polymer.

Often modifiers (source 7) are employed for the purpose of increasing the strength of the plastic component in the composite and typically are selected from ethylene-vinyl acetate, acrylate/methyl methacrylate graft polymer and chlorinated polyethylene.

Likewise it is also helpful to uses external lubricants (source 8) which are employed to reduce friction during the extrusion process. Useful are polyethylene wax and paraffin wax.

It is also preferable to use internal lubricants (source 9), such as fatty acid, fatty alcohol and fatty acid ester for the purposes of increasing the gelatinization of the powders during the extrusion step.

While not necessary fillers (source 10) can be added to reduce costs and can be selected from calcium carbonate, precipitated calcium carbonate and, if desired, pigments (source 11) can be used to give the extruded parts coloring. Pigments such as titanium dioxide, iron oxide and carbon black can be employed.

An example of a combination of powders used for manufacturing products according to this invention consists of (where PHR is Parts per Hundred Resin by weight):
(1) 100 PHR powdered PVC
(2) 10~90 PHR wood flour
(3) 0 to 7 PHR organic systematic or inorganic systematic thermal stabilizer—used in this example 2.5 PHR
(4) 0 to 5 PHR inorganic systematic foaming assistant—used in this example 1.2 PHR
(5) 0 to 3 PHR organic systematic foaming agent—used in this example 0.5 PHR
(6) 0 to 5 PHR inorganic systematic foaming agent—used in this example 1.5 PHR
(7) 0 to 15 PHR processing assistant of organic polymer system used in this example 12 PHR
(8) 0 to 10 PHR property modifier of organic polymer system—used in this example 8 PHR
(9) 0 to 5 PHR exterior lubricant of powder—used in this example 1.5 PHR
(10) 0 to 6 PHR interior lubricant of powder or liquid organic system—used in this example 2.5 PHR
(11) 0 to 10 PHR powder inorganic systematic filler used in this example 8 PHR
(12) 0 to 1.2 PHR pigment—used in this example 0.7 PHR In the thermal stirring mixer 12 the mixture of powders described above are stirred, first at 900 rpm (low speed) then at 1800 rpm (high speed) to insure the components are sufficiently dispersed and mixed to achieve a uniform dry blend powders. The thermal stirring mixture is operated from room temperature to 100° C. during this step in the process. Typically during this step the moisture content of the mechanically mixed powders is reduced to about 8% by weight. This step in the process usually takes from 11 to 12 minutes. In the above example the mixture of powders were stirred for 2 minutes at 900 rpm and for 10 minutes at 1800 rpm. A mixer suitable for this step is a CL-FB 1000 built by CHYAU LONG Company.

The next step in the process involves placing the mechanically mixed powders from the thermal stirring mixer 12 into the cold stirring mixer 13 where it is stirred low speed (900 rpm) until the temperature drops from 100° C. to 40° C. to dissipate heat of the blended powders from the thermal stirring mixture to prevent agglomeration. The powders are stirred in this mixture from 11 to 12 minutes and a mixer suitable for this step is CL-MA2000 built by CHYAU LONG Company. The product from the cold stirring mixer looks a good deal like sand.

Figure 2:
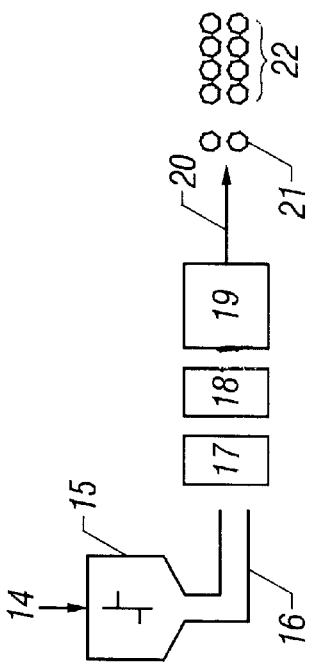
FIG. 2 is a schematic diagram of the extrusion processes of the invention to make structural components suitable for door and window frames.

To make structural components from the powders processed in the above manner the resultant mixture 14 is added to the feeding hopper 15 of the extrusion machine shown in FIG. 2. Typically such extrusion machines have a twin-screw extruder 17, such as the extruder model CM-65 built by Cincinnate that further processes the mixture by shearing and heating it until is gradually gelatinized. The gelatinized mixture is forced by the extruder into the adapter 18, then into the extrusion die 19 and finally through the calibration die 20 that controls the cross-sectional profile of the foamed element. Cooling this element as it leaves the extrusion machine is accomplished by cooling tank 21 and if the element's surfaces require a wood grain pattern, its surfaces are embossed by rollers 22. Finally the cooled and embossed element from the extrusion machine is drawn by a drawing machine (not shown) and cut into suitable lengths for the required product.

By controlling the vacuum venting of the extrusion machine the surface appearance of the extruded elements can be controlled and improved.

As the calibration die 20 controls the cross sectional profile of the extruded element made with this process, complicated shapes are easy to construct as well as more routine shapes used in door frames and the like. Typically the structures formed with this method will have a density between 0.5 and 1.1 gram/cubic centimeter and a molecular weight of about 90,000±40,000. Such structures have a linear thermal expansion between $1.9\times10^{-5}$ in/in-degrees Fahrenheit to $2.7\times10^{-5}$ in/in-degrees Fahrenheit.

What is claimed is:

1. A manufacturing method for making structural elements suitable for doors frames, sealed strips or other structural members from foamed plastic resin/wood flour composites comprising the step of:

combining powders composed of polyvinyl chloride powder, non-resin impregnated wood flour having a fiber length below 0.6 millimeters and a diameters not exceeding 0.6 millimeters, powdered stabilization agents, powdered foaming agents, powdered gelatinization agents and powdered lubricating agents; placing said combined powders in a thermal stirring mixer at a temperature from room temperature and stirring at a low speed to blend said combined powders, followed by stirring at a higher speed to disperse said powders in a homogeneous blend of said powders and to raise the temperature of said homogeneous blend of said powders to approximately 100 degrees centigrade;

placing said homogeneous blend of said powders in a cold stirring mixer to reduce the temperature from approximately 100 to 40 degrees centigrade by mixing at low speed to dissipate the heat in said homogeneous blend of said powders to prevent agglomeration of said homogeneous blend of said powders to form a resulting feed stock for an extrusion machine; and adding said resulting feed stock to an extrusion machine and extruding foamed structural shapes therefrom having a density between 0.5 and 1.1 gram/cubic centimeters.

2. The manufacturing method for forming structural members according to claim 1 wherein vacuum venting is employed in the extrusion process to enhance the surface appearance of the members.

3. The manufacturing method of forming of structural members according to claim 1 or 2 wherein the linear thermal expansion is between $1.9 \times 10^{-5}$ in/in-degree Fahrenheit to $2.7 \times 10^{-5}$ in/in-degree Fahrenheit.

4. The manufacturing method of forming structural members according to claim 1 or 2 wherein the extruded members have Young's Modules between 150,000 psi to 490,000 psi.

5. The manufacturing method or forming structural members according to claim 1 or 2 wherein the extruded members have Molecular Weight of 90,000±40,000.

6. The manufacturing method of forming structural members according to claims 1 and 2 wherein the moisture content of the extruded members is between 6 to 8% by weight.

7. The manufacturing method of forming structural members according to claim 1 where in the aspect ratio of the fibers in the wood flour is between 2 and 6.

8. The manufacturing method of forming structural members according to claim 1 wherein the wood flour content is between 10 and 55% by weight.

9. The manufacturing method of forming structural according to claim 1 wherein the structural members are embossed by rollers after leaving the extrusion machine to create graining patterns on the surfaces thereof.

* * * * *